Patented June 20, 1933

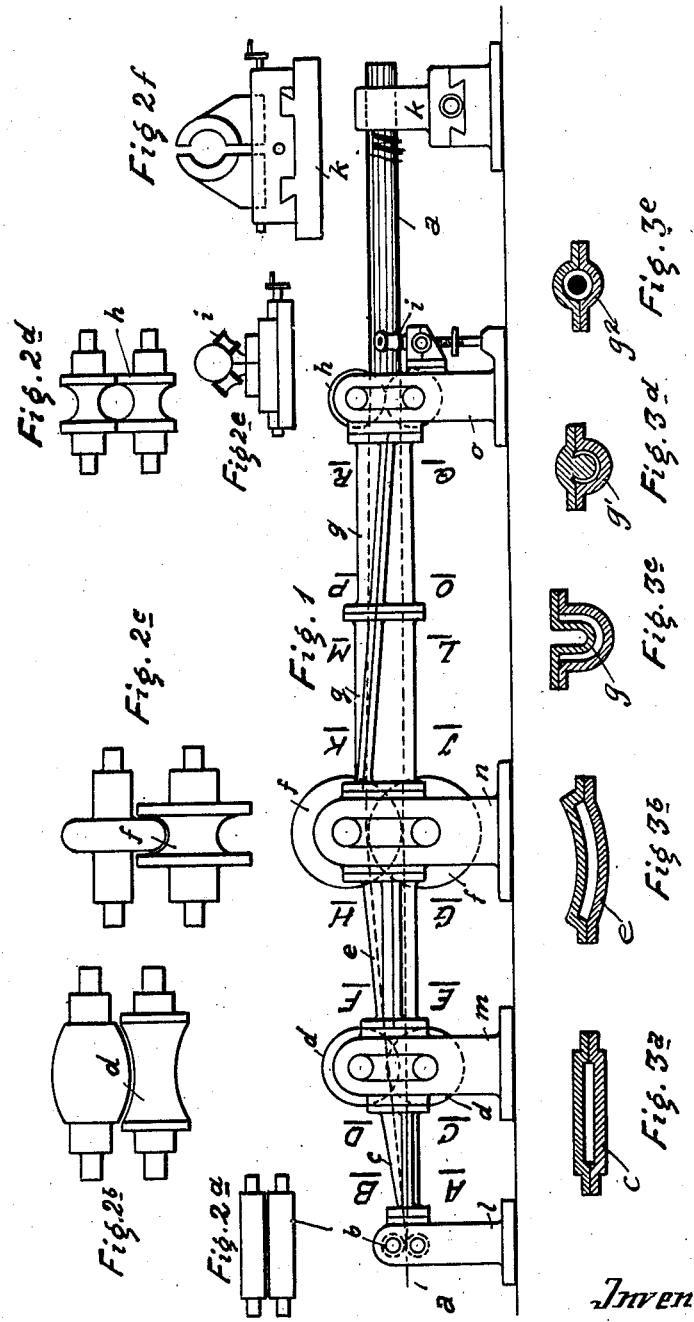

1,915,257

UNITED STATES PATENT OFFICE

KARL BREITENBACH, OF SIEGEN, GERMANY

MACHINE FOR THE MANUFACTURE OF SHEET METAL TUBES AND OTHER TUBULAR MEMBERS

Application filed September 12, 1928, Serial No. 305,551, and in Germany September 20, 1927.

It is known to manufacture tubes of sheet-metal pieces which are cut to the proper size and shape and are then bent on a bending machine until they have attained the desired curvature. As the length of the largest rollers of the bending machines amounts to from 3 to, at the highest, 5 meters, longer tubes must be composed of pieces (termed rings or belts) united with one another by welding seams or by rivets or in any other suitable manner. That manner of manufacturing long tubes requires much time, and besides, the tubes with circumferential welding seams are not so strong and durable as tubes having no such seams, and their quality is inferior.

It is also known to bend strips of sheet-metal into tubular shape by means of pairs of rollers and rolls, but this manner of manufacture can be carried out only with comparatively small tubes made while the metal is hot. The method is useless for larger tubes, as the interruptions between their individual profiles become, with larger tubes, also materially larger corresponding to the diameter of the rollers, and, furthermore, transition guides from one profile to another profile are lacking.

These deficiencies of the known devices are done away with by my present invention, the essential features of which reside therein that the pieces of sheet-metal, the length of which corresponds to the length of the tube to be made, are conducted in their longitudinal direction through uninterrupted transforming devices, the pieces, or the tube body respectively, being guided interiorly, as well as exteriorly, while being conducted through said devices. Smaller interruptions between the individual transforming devices are of no influence upon the transformation. In order to provide for a proper introduction into the said devices, the edges at the inlet members of the same must be enlarged and curved so that abutting is obviated.

My improved machine which operates in the above stated manner is illustrated diagrammatically and by way of example on the accompanying drawing on which Figure 1 is a side-view of a machine designed according to this invention; Figures 2a, 2b, 2c, 2d, 2e and 2f show in separate views the several pairs of rollers etc. between which the piece of sheet-metal is guided while passing from one transforming device to the next, and Figures 3a, 3b, 3c, 3d and 3e show cross sections through the several shape transforming means; Fig. 3a is a section in the plane A—B of Fig. 1, Fig. 3b a section in the planes C—D and E—F, Fig. 3c a section in the planes G—H and I—K, Fig. 3d a section in the planes L—M and O—P and Fig. 3e in the plane Q—R of Fig. 1. This machine renders it possible to manufacture tubes with open longitudinal seam of any length and any diameter and in a very short time, viz. in a few minutes. I wish it, however, to be understood, that also other workpieces than tubes, that is to say, tubular and gutter-shaped parts, may be manufactured according to this invention by machines or means which practically are equivalent to the machine or the means shown in the drawing.

On the drawing, $a$ (lefthand end of Fig. 1) denotes the piece or strip of sheet-metal to be transformed into a tube. It is introduced into the machine through the two straight rollers $b$ (Fig. 2a) by means of which the flat sheet-metal strips are shoved to a hollow member $c$ (Fig. 3ª), the free sectional area of which changes, however, from that shown in this (figure (3ª), which corresponds to the plane of section A—B of Fig. 1, to the free sectional area of the hollow member $e$ (Fig. 3b), the section of which corresponds to the plane C—D of Fig. 1. More precisely, it corresponds to this section, as well as to the plane of section E—F of Fig. 1, and between these members $c$ and $e$, in the latter of which the sheet-metal has been correspondingly curved, is a pair of conveying rollers $d$ (Fig. 2b) forming between them a gap that corresponds to the free sectional area of the member $e$. Anyhow, the height of that gap is such that the sheet-metal is not grasped between the rollers $b$, but is only guided or conducted by them.

The flat sheet-metal strip is grasped by the rollers $d$ and from this moment drawn in the direction to the rollers $f$ as soon as said strip has been shoved forwards sufficiently in the direction to the rollers *d* by the rollers *b*.

Also the member *e* corresponds, in fact, to two planes of sections of Fig. 1, viz. to the plane of section C—D, as well as to the plane of section E—F, as has already been stated, and the same is true of the next hollow member *g* (Fig. 3c), the free sectional area of which corresponds to the plane of section G—H, as well as to the plane of section J—K. Between the two hollow members *e* and *g* is a pair of conveying rollers *f* (Fig. 2c), the shape of which corresponds to the free sectional area of the space in the hollow member *g* (Fig. 3c), and also these rollers serve merely for moving the bent sheet-metal forwardly, whereas the shaping is effected solely by the stationary members *e* and *g*.

The next hollow member $g^1$ (Fig. 3d) corresponds again to two planes of section of Fig. 1, viz. to the planes of section L—M and O—P, the one section changing, of course, gradually into the other one, which is true also of the hollow members *c*, *e* and *g*, and it is, finally, also true of the hollow member $g^1$ and the last hollow member $g^2$ (it being understood that the hollow members $g^1$ and $g^2$ are made integral) which corresponds to the plane of section Q—R in Fig. 1. While the bent sheet-metal passes in U-form from the hollow member *g* to the hollow member $g^1$ and from this to the hollow member $g^2$ it is bent to tubular shape ($a^1$, Fig. 1) and gets now between the rolls *h* (Fig. 2d). Immediately behind these rolls are guide-rolls *i*, from which the sheet-metal tube $a^1$ passes to and through a drawing device *k* in which it is clamped fast.

This device is moved to and fro, that is to say, alternately away from, and towards the guide-rolls *i*. Normally it is located just in front of the rolls *i*. When a piece of sheet-metal has been transformed into tubular form, as stated, and the front end of the sheet-metal tube has arrived in the drawing device, this end is clamped fast therein, and the drawing device is now drawn positively away from the rolls *i* for such a length of way that the other end of the tube has arrived between the rolls *i*. Then the finished sheet-metal tube is removed from the machine, the drawing-device *k* moved back into its former position (at or near the rolls *i*), and another piece of sheet-metal is introduced into the machine at the rollers *b*.

The consecutive transformations of the piece of sheet-metal on its way through the machine can be distinctly pursued with the aid of the cross-sections through the transforming devices, as shown in the Figs. 3a–3e. I wish it to be understood, that the pairs of guide-rollers (Figs. 2a–2e) are not indispensably requisite. One or the other or some or, perhaps, all of them may, under circumstances, be dispensed with. Also the number and the design of the transforming devices may be smaller or larger than shown in the drawing merely by way of example.

I claim:

1. A machine for the manufacture of sheet-metal tubes and other tubular members of any length and any diameter, comprising, in combination, consecutive stationary transforming devices composed each of two superposed members leaving between them a gap, the sectional transverse shape of which corresponds to the sectional transverse shape which the skelp is to have at the respective phase of bending, the last of said pairs of members being adapted to transform the skelp into a gutter of U-shaped transverse section; another stationary transforming device also composed of two superposed members and arranged behind said last pair in the direction of motion of the skelp and forming a gap, which has U-shaped transverse section at that end which is located at the said last pair of transforming members and has annular transverse section at its other end so as to be adapted to transform said gutter into a tube, the width of said gap corresponding along its entire length to the thickness of the sheet-metal so as to act thereon at the outer and at the inner surface of the skelp while this is being transformed, and means for drawing the skelp through all said transforming members.

2. A machine for the manufacture of sheet-metal tubes and other tubular members of any length and any diameter, comprising, in combination, pairs of feeding rollers, each pair being composed of a male roller and a female roller, the shape of which in their axial direction corresponds to the transverse sectional shape which the skelp is to have at the respective bending phase, and stationary transforming devices arranged in alternation with said pairs of rollers and being each composed of two superposed members leaving between them a gap, the transverse sectional shape of which corresponds likewise to the transverse sectional shape which the skelp is to have at the respective phase of bending, the last of said pairs of members being adapted to transform the skelp into a gutter of U-shaped transverse section; another stationary transforming device arranged behind the last pair of rollers in the direction of motion of the skelp and forming a gap, which has U-shaped transverse section at that end which is located at the said last pair of transforming members and has annular transverse section at its other end so as to be adapted to transform said gutter into a tube, all said rollers operating as drawing rollers so as to draw the skelp through the machine from the entrance end of the same to the delivery end thereof.

3. A machine for the manufacture of sheet-metal tubes and other tubular members of any length and any diameter, comprising, in combination, pairs of feeding rollers, each pair being composed of a male roller and a female roller, the shape of which in their axial direction corresponds to the transverse sectional shape which the skelp is to have at the respective bending phase, and stationary transforming devices arranged in alternation with said pairs of rollers and being each composed of two superposed members leaving between them a gap, the transverse sectional shape of which corresponds likewise to the transverse sectional shape which the skelp is to have at the respective phase of bending, the last of said pairs of members being adapted to transform the skelp into a gutter of U-shaped transverse section; another stationary transforming device arranged behind the last pair of rollers in the direction of motion of the skelp and forming a gap, which has U-shaped transverse section at that end which is located at the said last pair of transforming members and has annular transverse section at its other end so as to be adapted to transform said gutter into a tube, the width of said gap corresponding along its entire length to the thickness of the sheet-metal so as to act thereon at the outer and at the inner surface of the skelp while this is being transformed, all said rollers operating as drawing rollers so as to draw the skelp through the machine from the entrance end of the same to the delivery end thereof.

In testimony whereof I affix my signature.

KARL BREITENBACH.